US006473784B2

(12) United States Patent
Haneda et al.

(10) Patent No.: US 6,473,784 B2
(45) Date of Patent: *Oct. 29, 2002

(54) INFORMATION PROCESSING APPARATUS FOR SENDING AND RECEIVING WRITTEN DATA WITH IDENTIFICATION INFORMATION

(75) Inventors: Isamu Haneda, Soraku-gun; Kouichi Harada, Kitakatsuragi-gun, both of (JP)

(73) Assignee: Sharp Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,327

(22) Filed: Dec. 29, 1998

(65) Prior Publication Data

US 2002/0129105 A1 Sep. 12, 2002

(30) Foreign Application Priority Data

Jan. 28, 1998 (JP) .......................................... 10-015505

(51) Int. Cl.⁷ ............................................... G06F 15/16
(52) U.S. Cl. ......................... 709/204; 709/205; 345/2.2
(58) Field of Search ................................. 709/204, 205; 705/406, 407; 707/541; 455/413, 416; 382/186, 187, 101; 379/93.24, 100.08, 158, 202, 905; 358/402; 345/330, 733, 734, 747, 2.2; 340/569, 545.6

(56) References Cited

U.S. PATENT DOCUMENTS

| | | | | |
|---|---|---|---|---|
| 5,084,770 A | * | 1/1992 | Nakayama | 358/403 |
| 5,208,912 A | * | 5/1993 | Nakayama et al. | 709/205 |
| 5,237,430 A | * | 8/1993 | Sukurai | 358/444 |
| 5,469,183 A | * | 11/1995 | Takatsuji et al. | 345/2.2 |
| 5,491,743 A | * | 2/1996 | Shilo et al. | 709/204 |
| 5,704,042 A | * | 12/1997 | Hester et al. | 345/753 |
| 5,933,478 A | * | 8/1999 | Ozaki et al. | 379/93.24 |
| 5,982,928 A | * | 11/1999 | Shimada et al. | 382/187 |
| 6,105,054 A | * | 8/2000 | Kawashima | 709/204 |

FOREIGN PATENT DOCUMENTS

| | | |
|---|---|---|
| JP | 6-284240 | 10/1994 |
| JP | 62-284240 A | 10/1994 |

* cited by examiner

Primary Examiner—Zarni Maung
Assistant Examiner—Wen-Tai Lin
(74) Attorney, Agent, or Firm—David G. Conlin; Steven M. Jensen; Edwards & Angell, LLP (57) ABSTRACT

A terminal apparatus is constituted by an added data input section, a writing start/completion detecting section, an input position detecting section, a connected terminal selecting section, a specific terminal information input section, an added data storing section, a specific terminal information storing section, a specific terminal judging section, a display section, a transmitting terminal identification information adding section, a transmitting terminal information storing section, a transmitting terminal judging section, a data transmitting section, a data receiving section, a memory section(not shown), and a section(not shown) for inputting and measuring date information. This arrangement allows an information processing apparatus, which sends and receives data to and from a plurality of information processing apparatuses via a communicating means and includes a common board for a plurality of information processings, to improve ability to recognize data.

14 Claims, 7 Drawing Sheets

| TERMINAL NUMBER | START TIME | COMPLECTION TIME | ADDED DATA |
|---|---|---|---|
| | | | |

INFORMATION PROCESSING APPARATUS FOR SENDING AND RECEIVING WRITTEN DATA WITH IDENTIFICATION INFORMATION

FIELD OF THE INVENTION

The present invention relates to an information processing apparatus which transmits and receives data to and from other information processing apparatuses via a communication means, and particularly concerns, for example, an information processing apparatus which uses a common board such as an electric blackboard device so as to realize real-time information exchange with other information processing apparatuses.

BACKGROUND OF THE INVENTION

In recent years, a teleconference which exchanges sound and image, etc. has prevailed by using a network system so that it has been possible to more precisely transmit information to the other on a real-time basis even if attendees stay physically far away from one another.

For a teleconference, an electronic blackboard, that is, a board which is commonly used by a plurality of users, has been introduced. Data are written, transmitted, and received by using the board so that each user using any terminal can confirm the same data on a real-time basis.

For example, Japanese Laid-Open Patent Application No. 6-284240/1994 (Tokukaihei 6-284240) discloses an electronic blackboard device for sending and receiving image data which are written by hand via a communication network. The above-mentioned patent application describes methods such as a method for displaying data inputted by the user in distinction from data being received, a method for displaying data which are being inputted and have not been transmitted in distinction from the data which have already been transmitted, and a method for allowing the received data to blink, etc. so as to call the attention of the user who has received the data.

With the above-mentioned conventional arrangement, in the case when not less than three terminals are connected with one another, the user can distinguish the data written by the user from the received data; however, it is not possible to recognize which terminal has sent the received data.

SUMMARY OF THE INVENTION

The objective of the present invention is to provide an information processing apparatus which allows the user to easily identify an apparatus which has transmitted data when the data are received via a communicating means.

To achieve the above-mentioned objective, the information processing apparatus of the present invention, which includes a board on which data can be written and sends and receives the data written on the board to and from other apparatuses via a communicating means, is characterized by:

a transmitting means for adding information inherent of the written data to the written data and for transmitting the data to other apparatuses;

a receiving means for receiving written data transmitted from other apparatuses together with added inherent information; and a display means for displaying the received written data in accordance with the added inherent information.

With the above-mentioned arrangement, the written data, which are sent through the transmitting means, are added inherent information. When the receiving means receives the written data and the inherent information, the display means displays the received written data in accordance with the inherent information. For example, the inherent information includes information for identifying the apparatus and time information such as writing start time and writing completion time of the data.

Here, assuming that the inherent information is identification information of the apparatus, it is possible to identify each of written data(to identify the apparatus which has sent each of written data). With this arrangement, when the receiving means receives a plurality of written data, the display means can vary, for example, colors and kinds of lines for each of written data so that it becomes possible to vary the display for each of written data. Therefore, with the aforementioned arrangement, upon receipt of a plurality of written data, the user can easily identify the apparatus which has sent each of the received data.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 8, the following explanation describes one embodiment of the present invention. Here, the present invention is not limited to the following arrangement.

Figure 1:
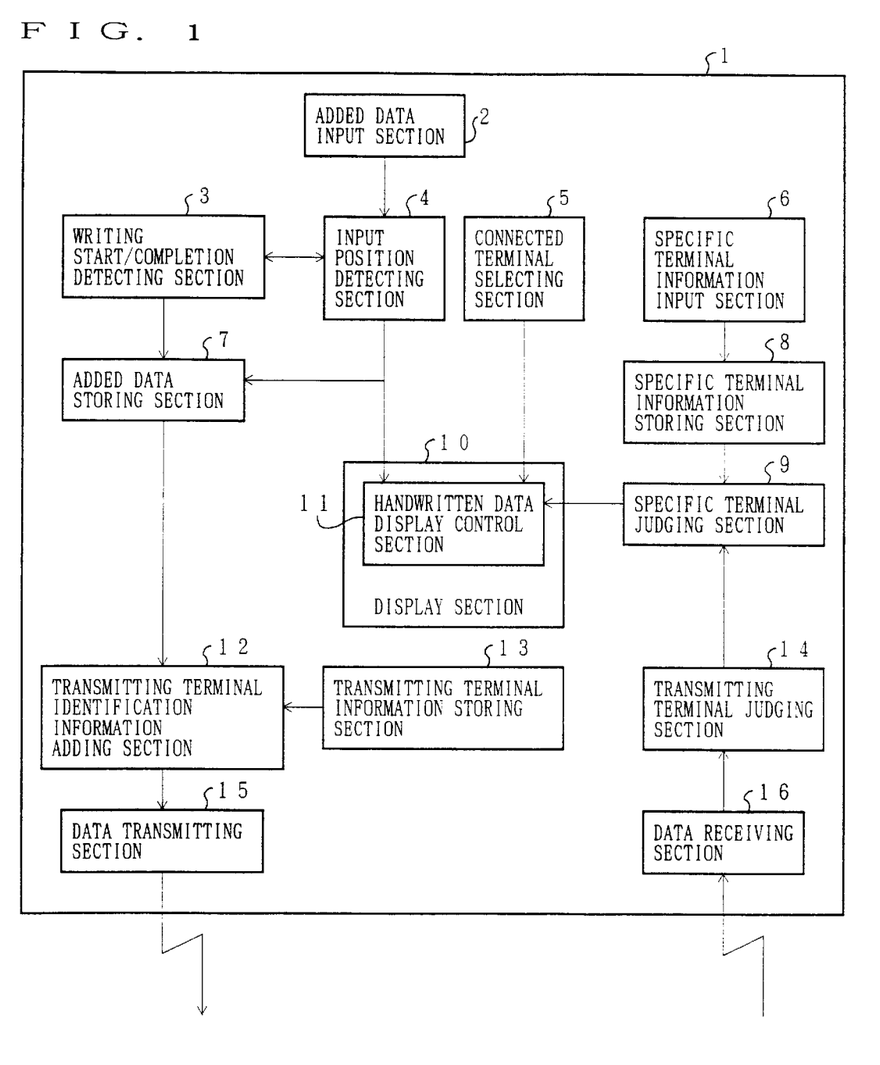
FIG. 1 is a block diagram showing a schematic construction of an information processing apparatus in accordance with the present invention.

FIG. 1 schematically shows a construction of a terminal 1 acting as an information processing apparatus of the present invention. The terminal 1 includes a common board (hereinafter, referred to as a board) to which data are written, and is commonly used among a plurality of apparatuses. For example, the terminal 1, which is used for sending and receiving the data written in the board via a communicating means such as a network, has a construction as follows:

Specifically, the terminal 1 is constituted by: an added data input section 2(writing means), a writing start/ completion detecting section 3, an input position detecting section 4, a connected terminal selecting section 5(specific apparatus selecting means), a specific terminal information input section 6, an added data storing section 7(written data storing section), a specific terminal information storing section 8(specific apparatus information storing section), a specific terminal judging section 9(specific apparatus judging section), a display section 10(displaying means), a transmitting terminal identification information adding section 12(identification information adding section), a transmitting terminal information storing section 13(identification information storing section), a transmitting terminal judging section 14(transmitting terminal judging means), a data transmitting section 15, a data receiving section 16, a memory section(not shown), and a date information inputting/measuring section(not shown) for inputting and measuring date information.

The added data input section 2 is, for example, constituted by an input instrument such as a pen, and is used for writing an added data(written data) in the board. The writing start/completion detecting section 3 detects the start time and the completion time of writing added data in accordance with information on input position of the input position detecting section 4. The writing start/completion detecting section 3 includes a timer for counting time of the start time and completion time of writing and constitutes a timer means.

The input position detecting section 4 detects the input position of the data which are inputted by the added data input section 2, and sends the detected result to the writing start/completion detecting section 3. The connected terminal selecting section 5 selects and specifies a specific terminal (apparatus). The contents are inputted to a handwritten data display control section 11 of the display section 10.

The specific terminal information input section 6 is provided for beforehand inputting information inherent of a specific terminal, for example, identification information serving as information of the specific terminal. The added data storing section 7 stores the added data which are inputted by the added data input section 2, the input position of the added data, and the result of detection of the writing start/completion detecting section 3. The specific terminal information storing section 8 stores the information of the specific terminal that is inputted in the specific terminal information input section 6.

The specific terminal judging section 9 compares the identification information included in the received data with the identification information on the specific terminal that is stored in the specific terminal information storing section 8, judges whether the received data have been sent from the specific terminal or not, and then sends the result to the handwritten data display control section 11.

The sending terminal information storing section 13 stores identification information of its own apparatus. The sending terminal identification information adding section 12 adds the identification information stored in the sending terminal information storing section 13 to the data stored in the added data storing section 7, and sends the added data to the data transmitting section 15. The sending terminal judging section 14 identifies a terminal which has sent the received data in accordance with identification information included in the data received in the data receiving section 16, and sends the result of identification to the specific terminal judging section 9 together with the received data.

The added data storing section 7, the sending terminal identification information adding section 12, the sending terminal information storing section 13, and the data transmitting section 15 constitute a transmitting means for adding the inherent information(for example, identification information of the apparatus and time information such as the start time and the completion time of writing, etc.) to the written data, and for sending the data to other apparatuses. By contrast, the data receiving section 16 constitutes a receiving means for receiving the written data which have been sent from another apparatus together with added information inherent of the sending apparatus.

The display section 10 displays the written data included in the received data in accordance with the inherent information which is included in the data received in the data receiving section 16. The display section 10 includes the handwritten data display control section 11 for controlling the display of the display section 10. The handwritten data display control section 11 receives signals from the input position detecting section 4, the connected terminal selecting section 5, and the specific terminal judging section 9.

Figure 2:
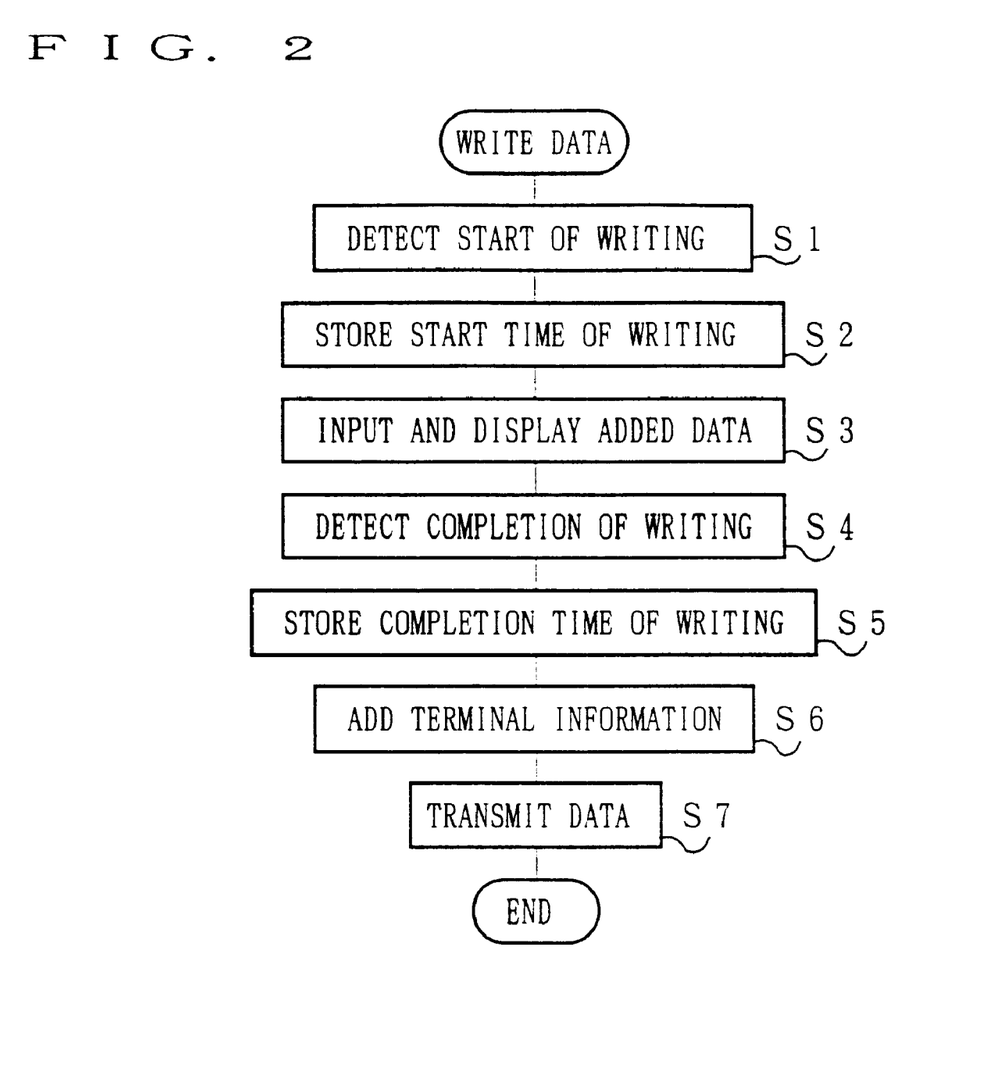
FIG. 2 is a flow chart showing a flow of operations of the information processing apparatus when data are transmitted.

Referring to a construction drawing of FIG. 1 and a flow chart of FIG. 2, the following explanation will discuss the data-transmitting operations of the apparatus in detail.

In the case when image data are inputted through the added data input section 2, firstly, for example, the user touches a writing start button(not shown) so as to provide instruction for the start of writing data. The input position detecting section 4 sends information in accordance with the inputted position(position when the writing start button is touched) to the writing start/completion detecting section 3, and then the writing start/completion detecting section 3 recognizes that t he inputted position is the position of the writing start button so as to detect the start of writing(Step 1; hereinafter, Step is abbreviated as S).

At this time, the memory section(not shown) stores the time when the writing start/completion detecting section 3 detects the start of writing(S2). Further, the added data storing section 7 stores the above-mentioned information as information on the start of writing.

Additionally, the writing start button is provided only for informing the apparatus of the start of inputting data, and is arranged in a part except for the display section 10 in the present embodiment. However, the writing start button is also allowed to be provided on the display screen of the display section 10.

Next, after the added data input section 2 has written data, the input position detecting section 4 detects the input position, and information on the input position is transmitted to the handwritten data display control section 11 and the added data storing section 7. The handwritten data display control section 11 allows the display section 10 to display the handwritten data in accordance with the information on the input position(S3). Meanwhile, the added data storing section 7 stores the handwritten data.

When the added data input section 2 completes the writing of the data, the user, for example, touches a writing completion button(not shown) so as to provide instruction for the completion of writing data. The input position detecting section 4 sends information in accordance with the inputted position(position when the writing completion button is touched) to the writing start/completion detecting section 3, and then the writing start/completion detecting section 3 recognizes that the inputted position is a position of the writing completion button so as to detect the completion of writing(S4).

Further, after the position information detected by the input position detecting section 4 has been sent to the writing start/completion detecting section 3, when the writing start/ completion detecting section 3 determines that the information is related to neither the position of the writing start button nor the position of the writing completion button, the writing start/completion detecting section 3 assumes that the data are being inputted. And then, the inputted data are displayed on the handwritten data display section 10.

Successively, when the writing start/completion detecting section 3 detects the completion of writing, the memory section memorizes the time as a writing completion time (S5). Further, the added data storing section 7 stores the information as information on completion of writing.

And then, when an instruction for sending data is provided, the transmitting terminal identification information adding section 12 adds the transmitting terminal information stored in the transmitting terminal information storing section 13 to the data to be sent, which have been stored in the added data storing section 7(S6). And the added data are sent from the data transmitting section 15 to the other terminals(S7). Here, the transmitting terminal information, information for identifying the terminal, includes a serial number of the terminal and an IP(Internet Protocol) address, and is stored in the transmitting terminal information storing section 13 in advance.

Figure 4:
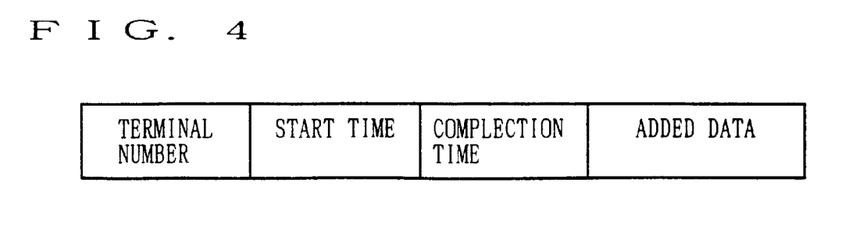
FIG. 4 is an explanatory drawing showing one example of a data structure which is sent and received among a plurality of information processing apparatuses.

Here, FIG. 4 shows one example of a data structure which is sent from the data transmitting section 15. In FIG. 4, "terminal number" represents the terminal information which is added in S6. "Start time" represents the start time of writing that is stored in S2, and "completion time" represents the completion time of writing that is stored in S5. Each information is stored in a fixed-length area before having been transmitted. "Added data" represents the handwritten data which are inputted in S3. The input position information detected in the input position detecting section 4 is stored while being compressed as a data row until the writing start/completion detecting section 3 detects the completion of writing.

Moreover, the above-mentioned explanation describes a case in which the user operates each button so as to instruct the start and completion of writing; however, the arrangement is not limited to this case. For example, the following arrangement is also allowed: in the case when the position of the handwritten data is inputted(in other words, the user touches with an input instrument such as a pen), the input position detecting section 4 detects the start of writing; and when a certain time has elapsed without the position being inputted after the start of writing was detected, the completion of writing is detected.

Figure 3:
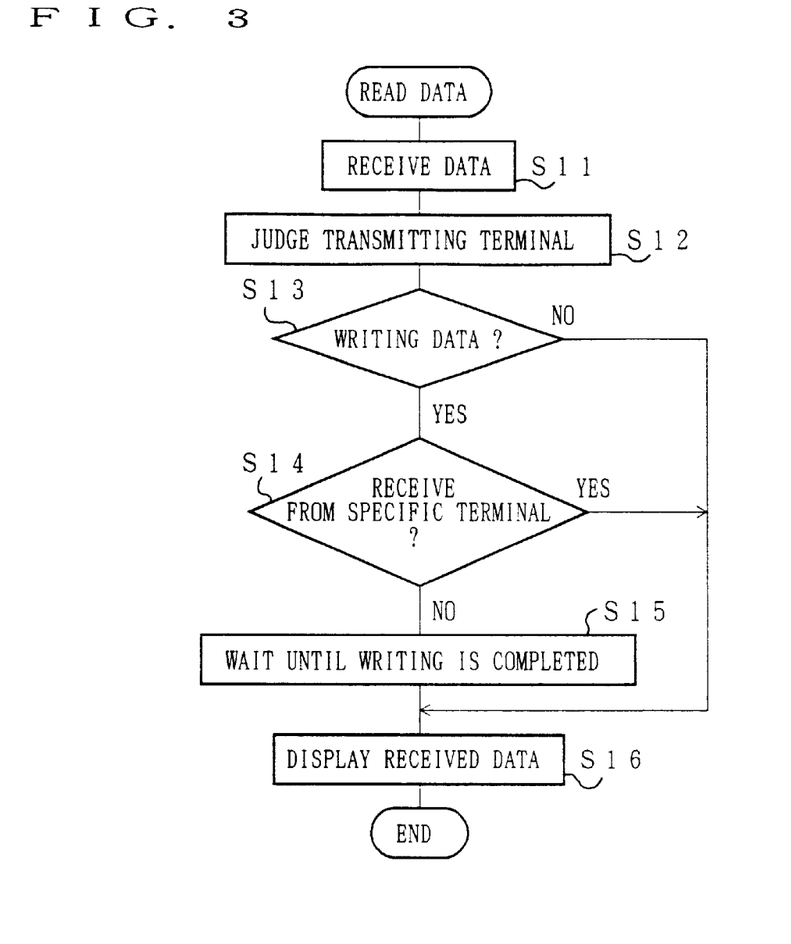
FIG. 3 is a flow chart showing a flow of operations of the information processing apparatus when data are received.

Referring to the construction drawing of FIG. 1 and a flow chart of FIG. 3, the following explanation will describe in detail operations of the apparatus for receiving the data sent by the above-mentioned arrangement.

The data receiving section 16 receives data transmitted from any one of terminals(S11). As described above, the received data include the terminal information(terminal number); thus, the transmitting terminal judging section 14 identifies which terminal has sent the received data in accordance with the terminal number(S12). A memory device(not shown) memorizes the result of identification and the sent data(received data).

Here, timing when display section 10 displays the received data differs depending upon whether the user is writing the data or not. In S13, when the user is not writing data, the display section 10 immediately displays the received data(S16). At this time, the received data are displayed by varying the kinds of lines such as a solid line and a broken line and colors, etc. in accordance with each of transmitted terminal information. For example, FIG. 5 describes a case in which the kind of line differs for each of transmitting terminals A, B, and C. Namely, a solid line corresponds to data received from the terminal A, a broken line corresponds to data received from the terminal B, and a chain line corresponds to data received from the terminal C.

Figure 5:
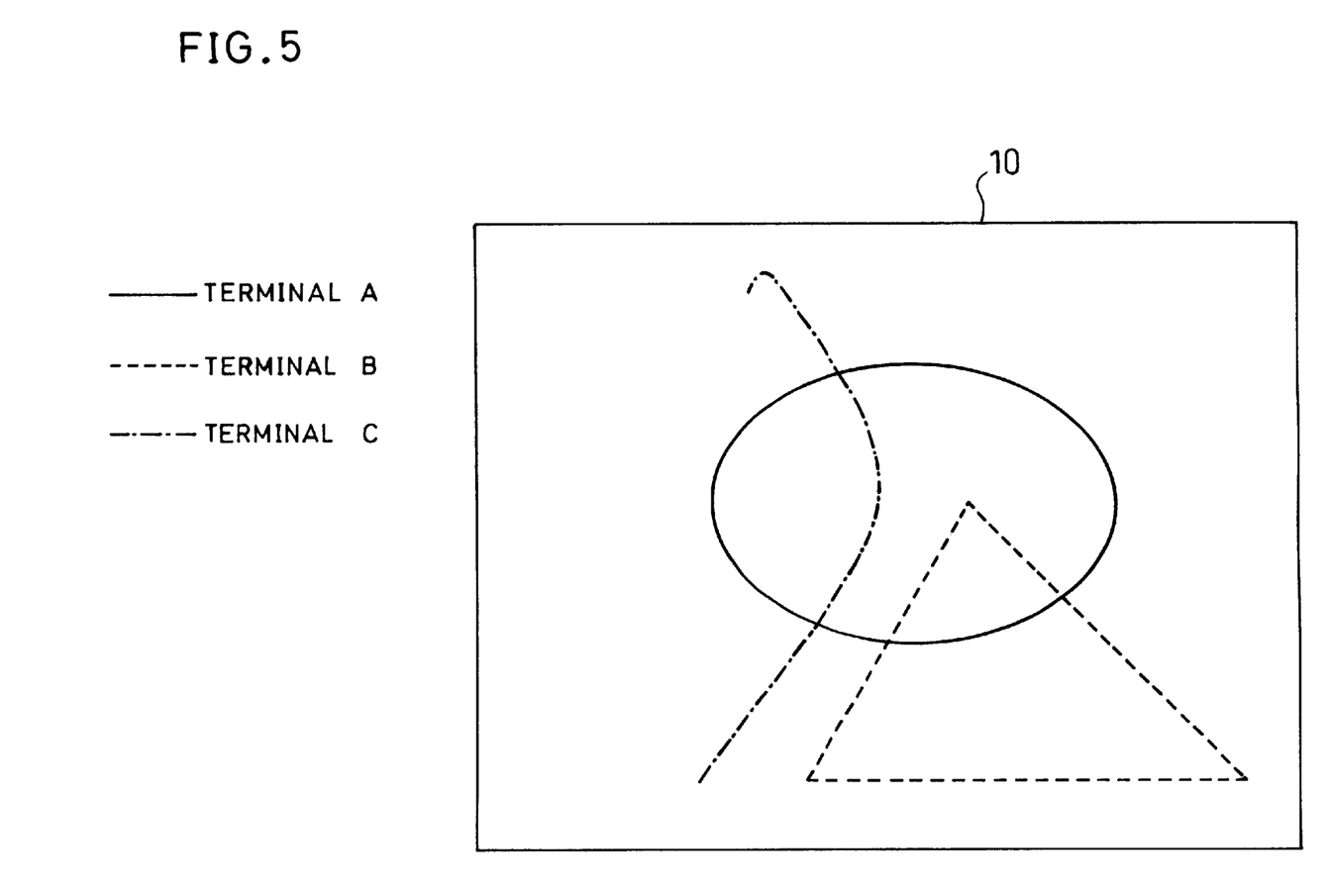
FIG. 5 is an explanatory drawing showing one example of a display image when data are received from other apparatuses.

In this case, for example, when the data are received from other apparatuses, it is possible to provide a display for identifying each of received data by varying colors and kinds of lines one another. Further, when the data are received from the same apparatus, it is possible to allow the user to recognize that the data are received from the same apparatus by, for example, displaying with the same color and kind of line.

By contrast, in the case when the user is writing the data, the step moves on to S14. The specific terminal judging section 9 determines whether the transmitting terminal information of the data that has just been received is the same as the specific terminal information that has been inputted in the specific terminal information input section 6 in advance and has been stored in the specific terminal information storing section 8 or not.

Figure 6:
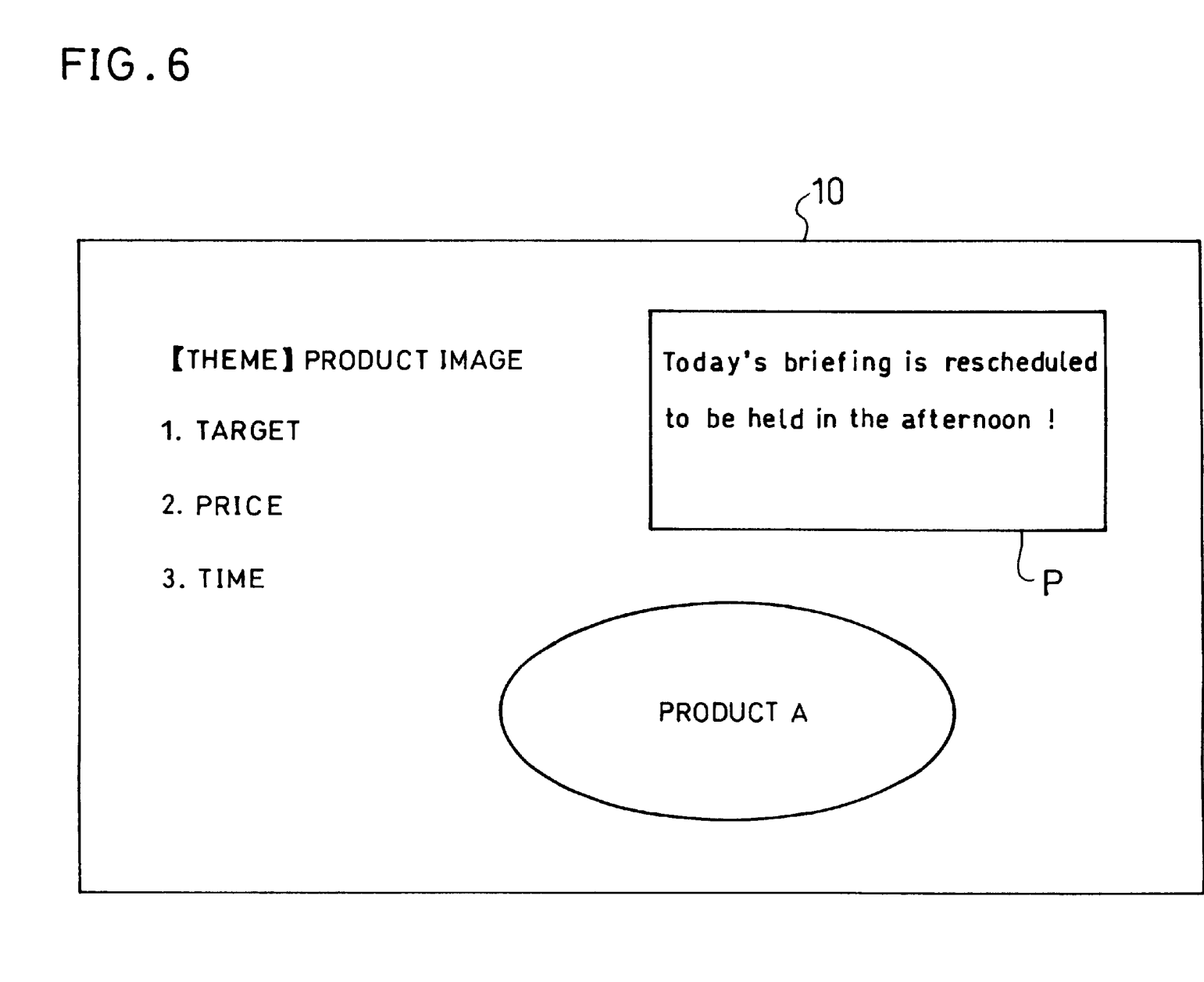
FIG. 6 is an explanatory drawing showing one example of the display image when data are received from a specific terminal while the user is writing data.

In S14, in the case when the received data are regarded as data sent from the specific terminal whose information has been inputted in advance, the step moves on to S16. The display section 10 displays the data received from the specific terminal preferentially before any other data by varying, for example, the kind of lines and colors, etc. FIG. 6 shows an example of displaying data which are sent from the specific terminal. In FIG. 6, for example, a part P surrounded by a thick line indicates the data sent from the specific terminal.

By contrast, in S14, in the case when the received data are not regarded as data sent from the specific terminal whose information has been inputted in advance, the step moves on to S15. The display section 10 waits for the completion of writing of the terminal and displays the received data after the writing has been completed(S16).

Therefore, in prior art, it is not possible to recognize who wrote data in a whiteboard after communication has been completed. However, the above-mentioned arrangement, in which the display is varied for each of the received data in accordance with the transmitting terminal information, makes it possible to easily identify the sender of the received data, in other words, who wrote the data.

Furthermore, in prior art, in the case when a specific person, for example, informs of urgent matters and instructions, it is not possible to contact via the whiteboard. Or even if the specific person writes urgent matters and instructions in the whiteboard, it is not possible to prove if the data were really written by the specific person or not. However, the present invention, in which the data received from the specific terminal is positively displayed on the screen, does not allow a response to the urgent matters and instructions to be late. Moreover, the specific person uses the specific terminal so that reliability of the data can be secured.

The aforementioned explanation described the method for displaying the data to be transmitted(handwritten data) and the data which are being received. As mentioned above, the data can be stored in the memory so that the following display is also allowed: after the communication has been completed, the connected terminal selecting section 5 selects one specific terminal so that it is possible to display the data sent from the specific terminal in a different way from other terminals.

Figure 7:
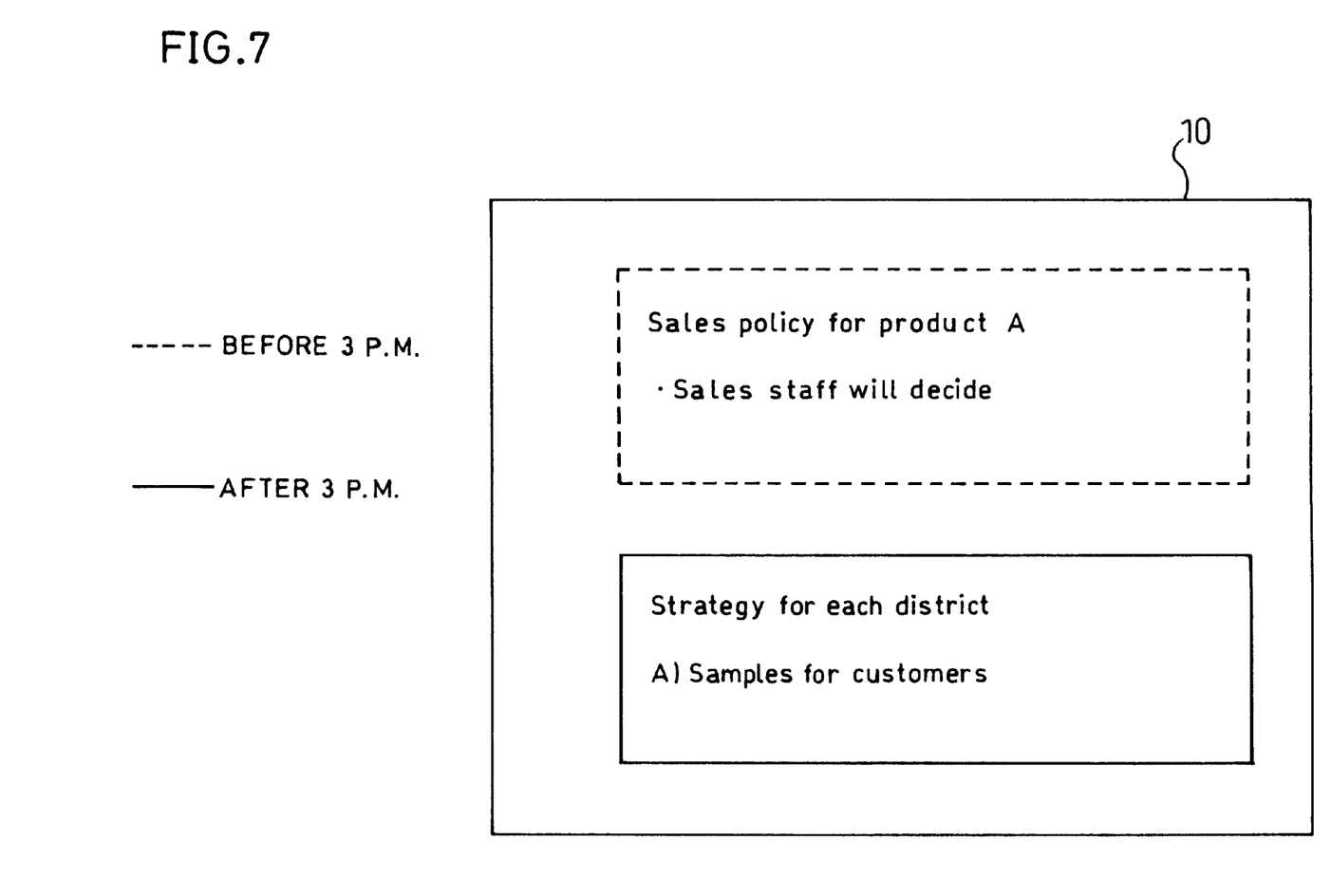
FIG. 7 is an explanatory drawing showing one example of the display image which varies for each of data written before and after base time.

Further, the sent data and the received data also include the input start time and the input completion time so that, based on the data, for example, it is possible to vary the display for each of data inputted before predetermined time(for example, 3 P.M.) and data inputted after the predetermined time, as shown in FIG. 7. Here, in FIG. 7, a broken line frame indicates the data written before 3 P.M., and a solid line frame indicates the data written after 3 P.M.

Moreover, the stored data can be sorted in order of the input start time or in order of the input completion time so that it is possible to know the time when the data have been firstly inputted(for example, time when a conference begins) and the time when the last data input has been completed(for example, time when the conference ends).

Figure 8:
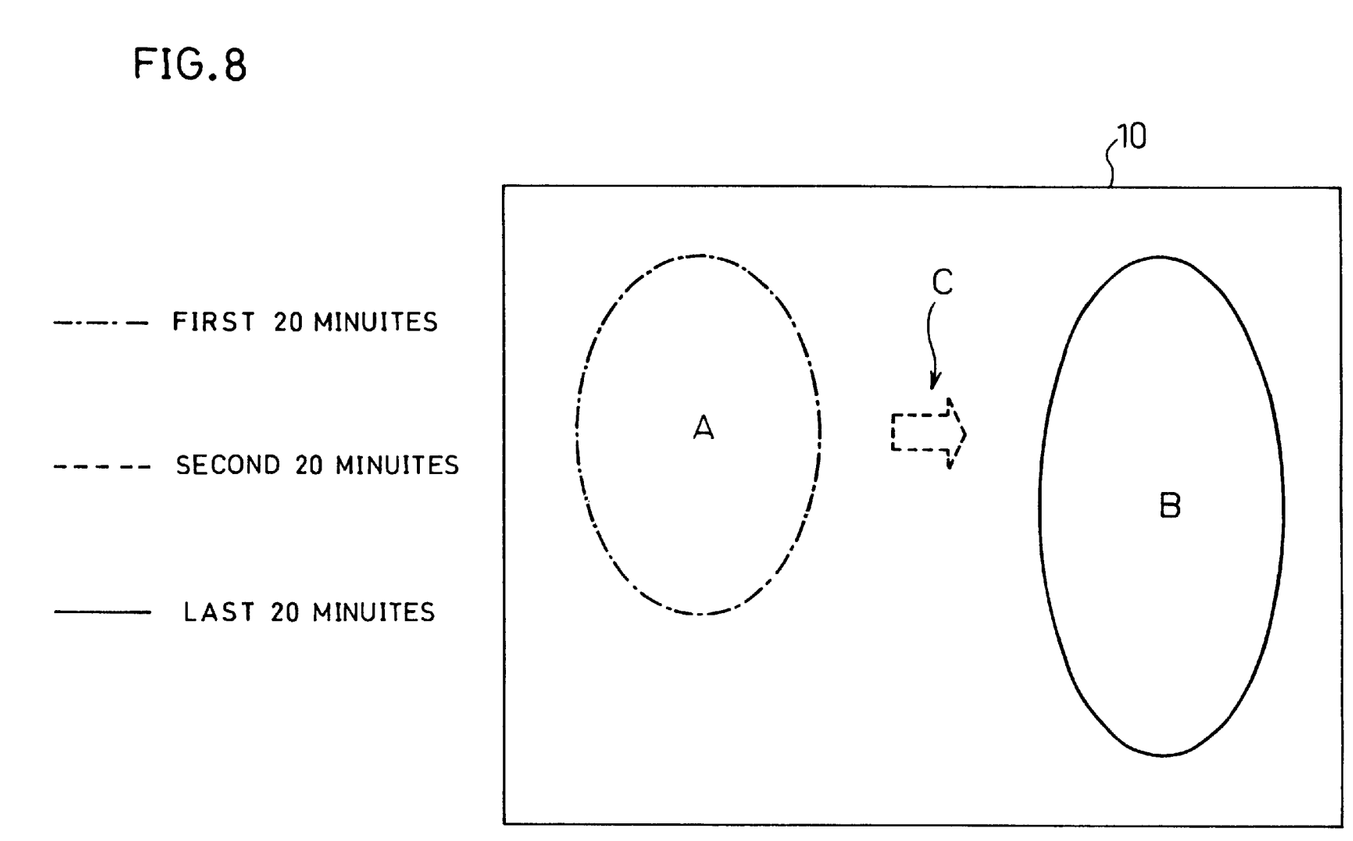
FIG. 8 is an explanatory drawing showing one example of the display image which varies for each time period of write time.

By using this time data, for example, as shown in FIG. 8, the proceeding of the conference is divided into the first time period(until twenty minutes elapses), the second time period (until another twenty minutes elapses), and the final time period(until still another twenty minutes elapses), and the data display can be varied for each time period. FIG. 8 is an example showing a case in which a part A(part surrounded by a chain line) is written in the first time period, an arrow C(part surrounded by a broken line) is written in the second time period, and a part B(part surrounded by a solid line) is written in the final time period.

Therefore, in prior art, when the communication is completed, it is not possible to recognize when the data have been written in the whiteboard during the conference; however, the present invention makes it possible to specify the time when the data have been written as well as the contents of the data.

As described above, the information processing apparatus of the present invention is also allowed to have a construction as follows: an information processing apparatus which sends and receives data to and from a plurality of information processing apparatuses via a communicating means and includes a common board for a plurality of information processings, is provided with: a transmitting means for adding identification information of the apparatus so as to transmit the data to other information processing apparatuses; a receiving means for receiving the identification information which has been sent from another information processing apparatus together with the data; and a display means for displaying the received data in accordance with the identification information received from the receiving means.

With the above-mentioned arrangement, it becomes possible to recognize at a glance which apparatus has sent the data written in the common board.

Further, the information processing apparatus of the present invention is also allowed to have a construction in which the display means displays data received from a specific information processing apparatus in a different way from other information processing apparatuses.

With the above-mentioned arrangement, it becomes possible to display data received from the specific information processing apparatus in a different way from other information processing apparatuses.

Moreover, the information processing apparatus of the present invention is also allowed to have a construction in which the display means firstly displays data received from the specific information processing apparatus before data received from any other information processing apparatuses.

With the above-mentioned arrangement, it becomes possible to firstly display data received from the specific information processing apparatus before data received from any other information processing apparatuses.

Furthermore, the information processing apparatus of the present invention is also allowed to have a construction as follows: an information processing apparatus which sends and receives data to and from a plurality of information processing apparatuses via a communicating means and includes a common board for a plurality of information processings, is provided with: a timer means for counting time; a transmitting means for transmitting a write time which is timed by the timer means together with the data; a receiving means for receiving the write time which has been sent together with the data; a display means for displaying the received data in accordance with the write time received from the receiving means.

With the above-mentioned arrangement, it becomes possible to vary the display of the data written in the common board for each time period so as to recall memories of attendees of the conference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus, which has a board to which data can be written, sends written data to other apparatuses, and receives written data from the other apparatuses via a communicating means, comprising:
   transmitting means for adding information inherent of said written data to said written data including identification information of the apparatus, and for transmitting the written data and the inherent information to the other apparatuses;
   receiving means for receiving the written data transmitted from the other apparatuses together with added inherent information; and
   display means for displaying the received written data in accordance with the added inherent information including received apparatus identification information, wherein the display means displays the written data transmitted from each apparatus in a different color or kind of line from the written data transmitted from the other apparatuses.

2. The information processing apparatus as defined in claim 1, further comprising transmitting terminal judging means for specifying a terminal which has transmitted the received written data in accordance with the received identification information.

3. The information processing apparatus as defined in claim 1, wherein said transmitting means comprising:
   a written data storing section for storing said written data,
   an identification information storing section for storing identification information of the apparatus, and
   an identification information adding section for adding said identification information to said written data.

4. The information processing apparatus as defined in claim 1, further comprising specific apparatus selecting means for selecting and specifying a specific apparatus,
   wherein said displaying means displays the written data transmitted from the specific apparatus in a different way from the written data transmitted from any other apparatuses, said specific apparatus being selected and specified by said specific apparatus selecting means.

5. The information processing apparatus as defined in claim 1, further comprising timer means for counting time of writing start time and writing completion time of data, wherein said transmitting means adds time information obtained by said timer means to said written data and transmits the data to the other apparatuses, and said displaying means varies the display of the written data in accordance with the received time information.

6. The information processing apparatus as defined in claim 5, wherein said display means varies the display for each of data written before a predetermined time and data written after the predetermined time.

7. The information processing apparatus as defined in claim 5, wherein said display means displays the written data in order of writing start time.

8. The information processing apparatus as defined in claim 5, wherein said display means displays the written data in order of writing completion time.

9. The information processing apparatus as defined in claim 5, wherein said display means displays the written data which are divided into predetermined time periods in a manner so as to vary the display for each time period.

10. An information processing apparatus, which has a board to which data can be written, sends written data to other apparatuses, and receives written data from the other apparatuses via a communicating means, comprising:

transmitting means for adding information inherent of said written data to said written data including identification information of the apparatus, and for transmitting the written data and the inherent information to the other apparatuses;

receiving means for receiving the written data transmitted from the other apparatuses together with added inherent information; and display means for displaying the received written data in accordance with the added inherent information including received apparatus identification information, wherein said display means displays the written data transmitted from each apparatus in a different color or kind of line from the written data transmitted from the other apparatuses, and firstly displays the written data received from one apparatus before the data received from any of the other apparatuses.

11. An information processing apparatus, which has a board to which data can be written, sends written data to other apparatuses, and receives written data from the other apparatuses via a communicating means, comprising;

writing means for writing data to said board;

transmitting means for adding information inherent of said written data to said written data including identification information of the apparatus, and for transmitting the written data and the inherent information to the other apparatuses;

receiving means for receiving the written data transmitted from the other apparatuses together with added inherent information;

display means for displaying the received written data in accordance with the added inherent information including received apparatus identification information, wherein said display means displays the written data transmitted from each apparatus in a different color or kind of line from the written data transmitted from the other apparatuses, and displays said received written data immediately when said received written data are received from the other apparatuses while a user using the display means is not writing data by using said writing means.

12. The information processing apparatus as defined in claim 11, wherein said display means varies a display for each of the received written data when the received written data are received from a plurality of apparatuses.

13. The information processing apparatus as defined in claim 11 further comprising:

a specific apparatus information storing section for storing information inherent of a specific apparatus, and a specific apparatus judging section for comparing the identification information included in the received data with said inherent information so as to determine whether the received data are transmitted from the specific apparatus or not, wherein when said receiving means receives written data from another apparatus while the user is writing data, and said specific apparatus judging section determines that the received data are the data transmitted from the specific apparatus, said display means displays the received written data received from the specific apparatus.

14. The information processing apparatus as defined in claim 11, further comprising:

a specific apparatus information storing section for storing information inherent of a specific apparatus, and a specific apparatus judging section for comparing the identification information included in the received data with said inherent information so as to determine whether the received data are transmitted from the specific apparatus or not, wherein when said receiving means receives the received written data from another apparatus while the user is writing data, and said specific apparatus judging section determines that the received written data are not the data transmitted from the specific apparatus, said displaying means displays the received written data after the user has completed the writing of the data.

* * * * *